Feb. 22, 1938.   R. R. HASKELL ET AL   2,109,066
ASSEMBLING AND LAYING MASTER SHEETS FOR DUPLICATION
Filed Aug. 30, 1934    3 Sheets-Sheet 1

Inventors:
Robert R. Haskell,
Henry J. Morton
By: Zabel, Carlson & Wells
Attys.

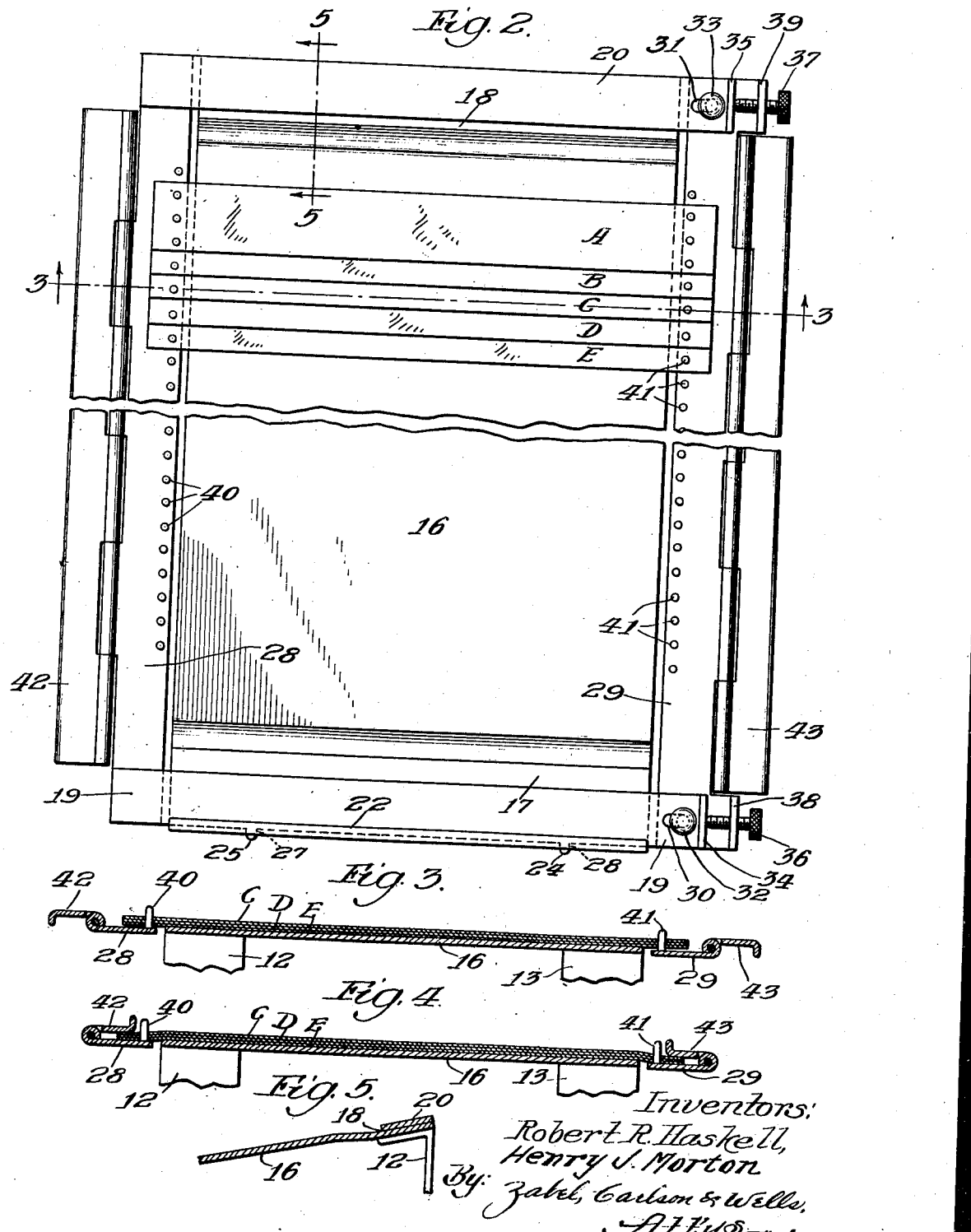

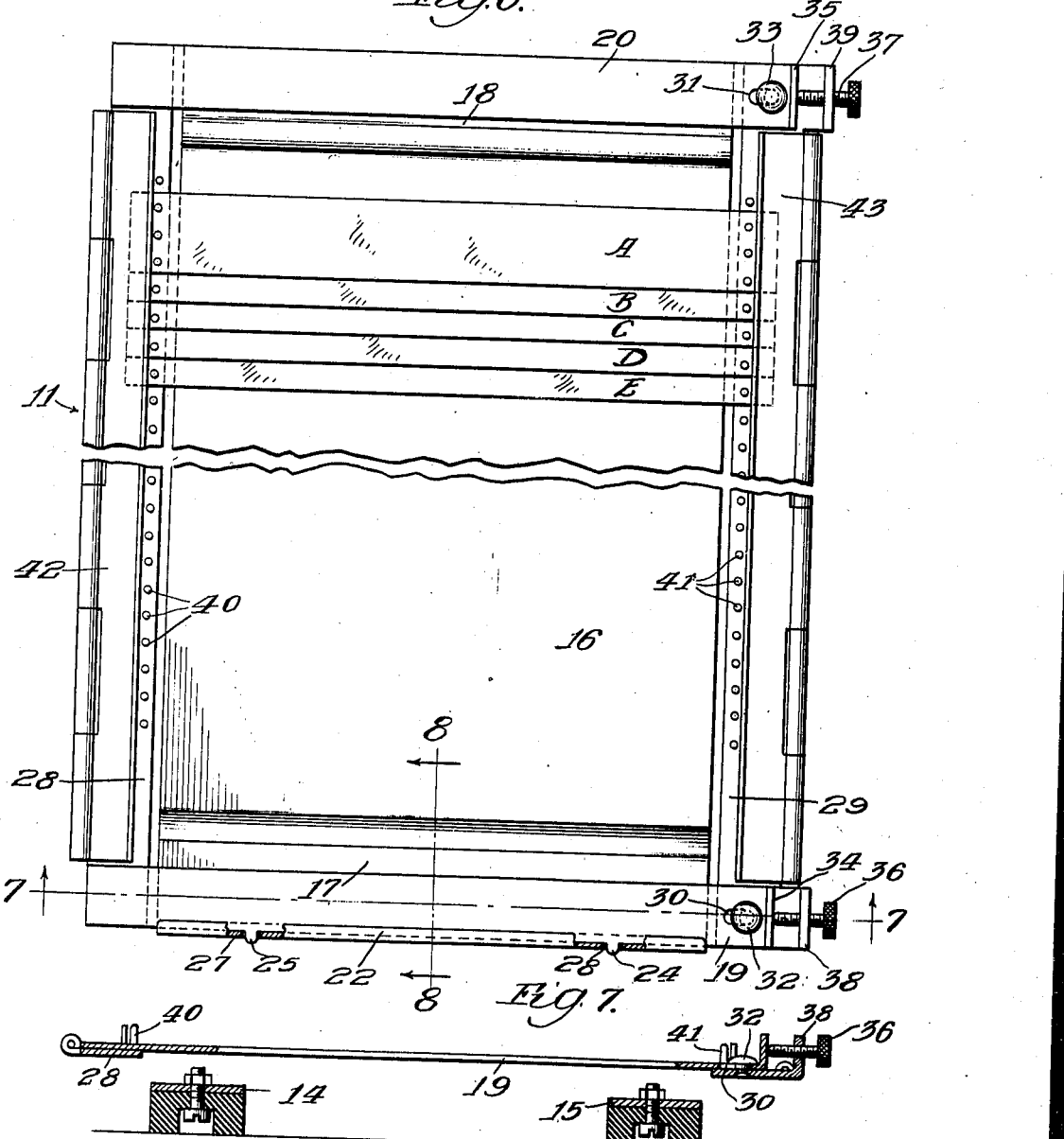
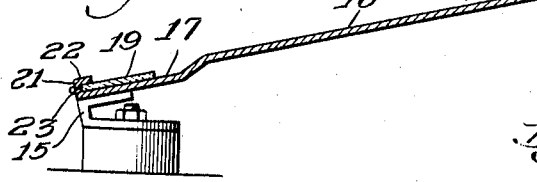

Patented Feb. 22, 1938

2,109,066

UNITED STATES PATENT OFFICE 2,109,066

ASSEMBLING AND LAYING MASTER SHEETS FOR DUPLICATION

Robert R. Haskell, Swampscott, Mass., and Henry J. Morton, Batavia, Ill., assignors to Ditto, Incorporated, Chicago, Ill., a corporation of West Virginia Application August 30, 1934, Serial No. 742,116

14 Claims. (Cl. 101—131)

This invention relates to duplicating mechanisms and particularly to the assembling and laying of master strips or sheets where it is desired to duplicate on a single copy sheet the data which is contained upon several master sheets.

In many of the records kept in business, it is often times highly desirable to have a copy or record which is made up from the information contained, for example, upon columns found on several different sheets of the original records.

To facilitate obtaining these records, it is the purpose of the present invention to provide an improved method whereby strips or sections of original records made in copying ink may be assembled together into a composite master and applied to the duplicating mechanism for producing a composite copy including the desired information from said strips of master or original records.

Other and more detailed objects and advantages of the invention will appear as the description proceeds in connection with the accompanying drawings wherein one form of the invention is shown.

In the drawings—

Fig. 2 is a plan view illustrating the master sheet frame;

Fig. 3 is a sectional view on the line 3—3 of Fig. 2;

Fig. 4 is a view like Fig. 3 showing a further step in the assembling;

Fig. 5 is a sectional view on the line 5—5 of Fig. 2;

Fig. 6 is a plan view showing the device in the position illustrated in section in Fig. 4;

Fig. 7 is a sectional view on the line 7—7 of Fig. 6; and

Fig. 8 is an enlarged sectional view on the line 8—8 of Fig. 6.

Figure 1:
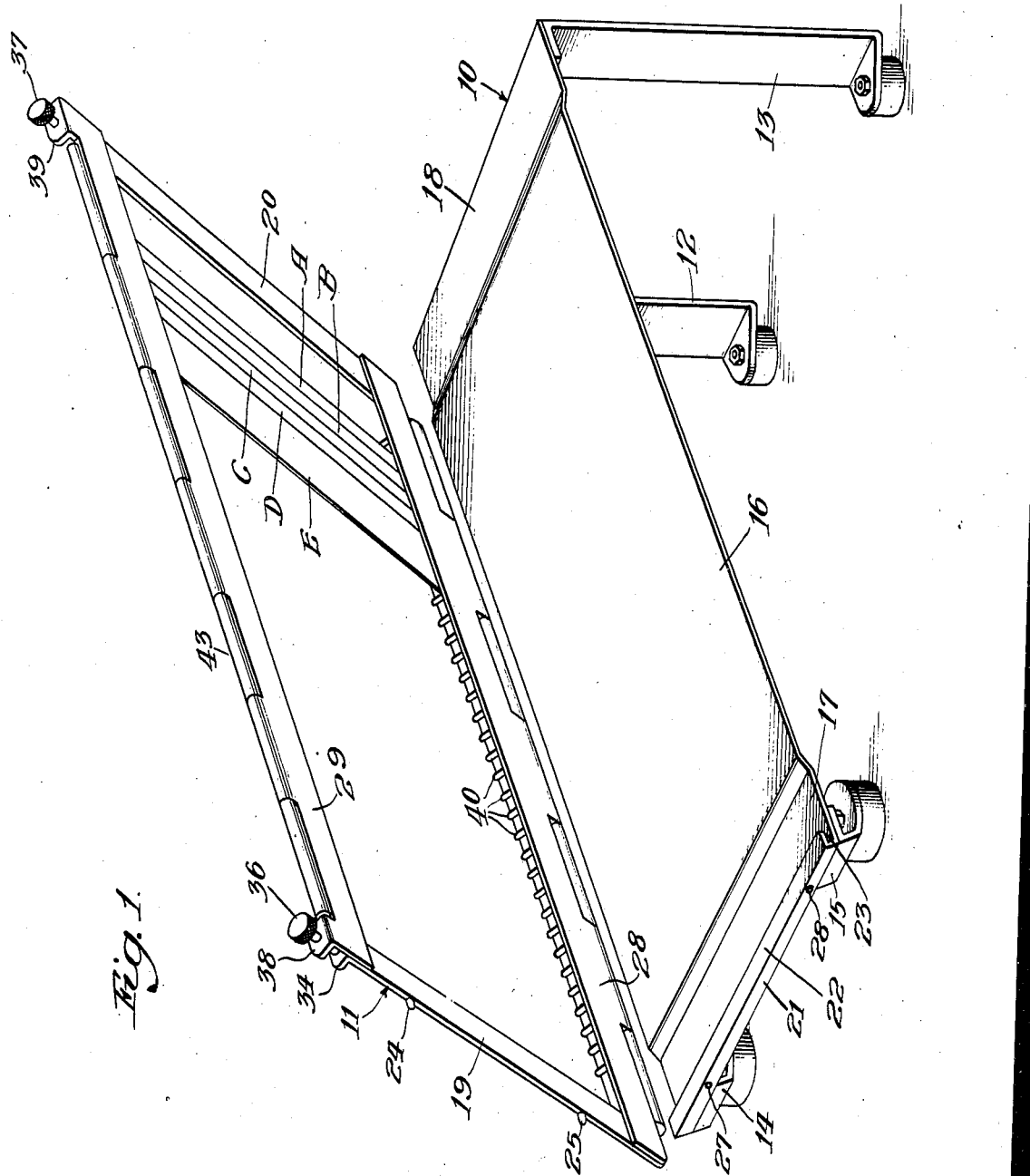
Fig. 1 is a perspective view of a portion of the mechanism for assembling the master sheets.

The device as illustrated in the drawings consists of a stand 10 and an assembling frame 11 together with certain other elements which will be described more fully in detail hereinafter whereby a plurality of master sheets or original record sheets such as A, B, C, D, and E may be brought together in proper position to be applied to a duplicating mechanism and thereby caused to produce a composite copy of the information contained upon the master sheets.

The stand 10, as shown in Fig. 1, has the legs 12, 13, 14, and 15 supporting the bed or plate 16 substantially in the position shown in Fig. 1 with one end thereof higher than the other. The frame 11 is adapted to rest upon the stand 10 with its end pieces 19 and 20 lying upon the portions 17 and 18 of the stand, these portions being lowered slightly below the main part of the bed 16 as shown clearly in Fig. 1. At the lower end of the stand, the metal sheet which forms the bed and end portions 17 and 18 is turned up and bent over as indicated at 21 and 22 to provide a transverse groove 23 that is adapted to receive the end piece 19. This end piece 19 is provided with a pair of projections 24 and 25 which fit in the holes 26 and 27 provided in the upturned portion 21 of the stand. The frame 11 is adapted to be removed from the stand 10 and applied to the flat bed or platen of a duplicating machine of the hectograph type. It is, therefore, preferable to provide in the standard margin bar of the duplicating machine a spaced pair of openings to receive the projections 24 and 25 and thus accurately position the frame 11 with respect to the printing surface of the duplicating machine.

The frame 11 has the side plates 28 and 29 connecting the end pieces 19 and 20. The end pieces are secured rigidly and permanently to the side plate 28, but the side plate 29 is movable with respect to the end pieces so as to permit of a certain amount of adjustment between the plates 28 and 29. To accomplish this adjustment, we provide in the end pieces 19 and 20 suitable elongated openings 30 and 31 and secure the plate 29 to the end pieces by means of pins or rivets 32 and 33 in the manner shown clearly in Fig. 7. The ends of the pieces 19 and 20 are turned up as indicated at 34 and 35 to form abutments for the adjusting screws 36 and 37. These screws are screw-threaded in the turned up portions 38 and 39 at the opposite ends of the member 29.

It is believed to be evident from the foregoing description that, within the limits provided by the slots or openings 30 and 31, the plate 29 can be moved with respect to plate 28 by adjusting the screws 36 and 37.

The plate 28 carries a row of pins 40, and the plate 29 has a corresponding row of pins 41. The original or master sheets which are used in making the records are provided along opposite edges with spaced holes, the spacing of which is equal to that of the spacing of the pins 40 and 41.

Now, when it is desired to make up a composite master, the sheets having the information desired may be cut up into strips or they may be originally in elongated strip form. These sheets then are applied, as shown in Fig. 2, with the printed matter thereon facing downward, the frame 11, of course, being placed flat upon the stand 10 so that the bed plate 16 forms a support for the sheets between their ends as shown clearly in Fig. 3. The sheets are overlapped if it is desired to print only a portion of the material on a sheet so that only that portion of the material which is to be printed is exposed at the bottom. The pins 40 and 41 fitting in the openings at the opposite edges of the sheets accurately position them with respect to each other and hold them in place. It may be necessary to adjust the plate 29 outward or inward so as to have the master sheets tight across the frame.

Then, when the sheets are all assembled upon the pins 40 and 41, the hinged gripping plates 42 and 43, which are hinged to the outside edges of plates 28 and 29, are turned over from the position shown in Fig. 3 to that shown in Fig. 4 so that these plates 42 and 43 may be held down against the side edges of the master sheets to secure them in place on the frame 11. The frame 11 is then picked up from the stand 10 and placed with the pins upward upon the printing surface or duplicating band of the duplicating machine. Preferably the projections 24 and 25 are engaged in corresponding openings provided in the standard margin bar of the duplicating machine. The masters are pressed down upon the duplicating surface so as to provide a copy reproducing print on the gelatin band, and then the master sheets are merely picked off again by lifting the frame 11 to strip them from the gelatin band. They can be returned to the stand 10, and copies are made from the print on the gelatin band in the usual well-known manner. Such copies will, of course, be composite copies of the exposed material on the under surface of the assembled master sheets.

While certain embodiments of the invention have been shown and described, it is to be understood that it is capable of many modifications. Changes, therefore, in the construction and arrangement may be made without departing from the spirit and the scope of the invention as disclosed in the appended claims in which it is the intention to claim all novelty inherent in the invention as broadly as possible in view of the prior art.

The invention having thus been described, what is claimed as new and desired to be secured by Letters Patent is:

1. A method of duplicating selected portions of records formed on a plurality of master sheets, which comprises assembling and securing together the opposite ends of the master sheets in overlapping relationship to expose only the selected portions of the records thereon on one side of the assembly, laying the assembly upon a duplicating surface, stripping the assembly from said surface, and thereafter applying a copy sheet to said surface.

2. A device of the character described comprising a supporting bed having a substantially flat surface upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface.

3. A device of the character described comprising a supporting bed having a substantially flat surface upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface, and said plates being adjustable toward and away from each other.

4. A device of the character described comprising a supporting bed having a substantially flat surface upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface, said securing means comprising rows of pins on said plates spaced to fit corresponding holes provided in the master sheets.

5. A device of the character described comprising a supporting bed having a substantially flat surface upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface, said mounting plates being connected by a pair of end pieces to provide a frame and one of said plates being adjustably mounted on the end pieces to vary the distance between said plates.

6. A device of the character described comprising a supporting bed upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface, said mounting plates being connected by a pair of end pieces to provide a frame, and means on one of said end pieces for aligning the frame with said supporting bed.

7. A device of the character described comprising a supporting bed upon which master sheets may be placed in parallel or overlapping relationship, mounting plates having securing means thereon to which opposite edges of the master sheets are secured while on said support said plates being movable with respect to said bed for transferring the master sheets while assembled to a duplicating surface, said securing means comprising rows of pins on said plates spaced to fit corresponding holes provided in the master sheets, and clamping members on the mounting plates for holding the sheets on said pins.

8. A device of the character described comprising a frame for mounting master sheets in parallel or overlapping relationship, said frame having a pair of mounting plates, means connecting them together and holding them in spaced relation, rows of mounting pins on said plates to fit corresponding holes provided in the master sheets, said mounting plates having clamping means hinged thereon to clamp the respective master sheets thereto.

9. A device of the character described comprising a frame for mounting master sheets in parallel or overlapping relationship, said frame having a pair of mounting plates, means connecting them together and holding them in spaced relation, rows of mounting pins on said plates to fit corresponding holes provided in the master sheets, said mounting plates having clamping means hinged thereon to clamp the respective master sheets thereto, said clamping means comprising plates running lengthwise of said mounting plates and hinged thereto to swing over the plates and clamp the master sheets on said pins.

10. A device of the character described comprising a frame for mounting master sheets in parallel or overlapping relationship, said frame having a pair of mounting members, means connecting said members together in spaced relation, said members including rows of mounting pins to fit corresponding holes provided in the master sheets, and clamping bars for holding the assembled master sheets on said pins.

11. A device of the character described comprising a frame for mounting master sheets in parallel or overlapping relationship, said frame having a pair of mounting members, means connecting said members together in spaced relation, said members including rows of mounting pins to fit corresponding holes provided in the master sheets, and clamping bars for holding the assembled master sheets on said pins, one of said mounting members being movable toward and away from the other, and said connecting means including means to secure said members against movement toward each other.

12. A device of the character described comprising a frame for mounting master sheets in parallel or overlapping relationship, said frame having a pair of mounting members, means connecting said members together in spaced relation, said members including rows of mounting pins to fit corresponding holes provided in the master sheets, and clamping bars for holding the assembled master sheets on said pins, a bed adapted to receive said frame, and cooperating means on the bed and frame for positioning the frame on the bed.

13. A device of the character described comprising a frame for mounting master sheets in parallel or overlapping relationship, said frame having a pair of mounting members, means connecting said members together in spaced relation, said members including rows of mounting pins to fit corresponding holes provided in the master sheets, and clamping bars for holding the assembled master sheets on said pins, a bed adapted to receive said frame, and cooperating means on the bed and frame for positioning the frame on the bed, said cooperating means comprising projections on the frame and seats for said projections on the bed.

14. A method of duplicating, which method comprises preparing a plurality of master sheets with copying ink, detachably clamping the opposite end portions only of said sheets to a support whereby to keep the legend carrying parts thereof in fixed position with respect to each other and free of any added backing to form a composite master, applying the composite master directly to a hectograph surface to transfer the matter to be copied to said surface, stripping said composite master from said surface, and applying a copy sheet to said surface.

ROBERT R. HASKELL.
HENRY J. MORTON.